United States Patent [19]

Mosher

[11] Patent Number: 4,562,026
[45] Date of Patent: Dec. 31, 1985

[54] COMPRESSION MOLDING AGAINST AN INSERT

[75] Inventor: Mark D. Mosher, Mesa, Ariz.

[73] Assignee: Motorola, Inc., Schaumburg, Ill.

[21] Appl. No.: 589,809

[22] Filed: Mar. 15, 1984

[51] Int. Cl.⁴ .............................................. B29C 43/18
[52] U.S. Cl. .................................... 264/135; 264/137;
264/259; 264/274; 264/276; 264/334; 425/127;
425/812
[58] Field of Search ............ 264/137, 274, 276, 328.9,
264/257, 268, 320, 322, 102, 259, 135; 425/812,
127, 401, DIG. 5, DIG. 34

[56] References Cited

U.S. PATENT DOCUMENTS

| Re. 25,560 | 4/1964 | Gifford ................................ 264/276 |
| 1,475,764 | 11/1923 | Frederick ............................ 264/137 |
| 1,826,945 | 10/1931 | McKay et al. . | |
| 2,028,592 | 1/1936 | Crowley ............................... 264/276 |
| 2,032,869 | 3/1936 | Cobb ..................................... 425/401 |
| 2,277,599 | 3/1942 | McGinnis . | |
| 2,378,642 | 6/1945 | Kopplin ............................... 264/137 |
| 2,401,180 | 5/1946 | Parmelee ............................. 264/137 |
| 2,433,412 | 12/1947 | Wilson ................................. 425/517 |
| 2,446,213 | 8/1948 | Clark et al. ......................... 264/274 |
| 2,615,203 | 10/1952 | DuPree . | |
| 2,716,623 | 8/1955 | Tator .................................... 425/812 |
| 3,423,792 | 1/1969 | Morin ........................... 425/DIG. 34 |
| 3,440,313 | 4/1969 | Schmocker ......................... 264/276 |
| 3,458,903 | 8/1969 | Shelby . | |
| 4,014,970 | 3/1977 | Johnle ................................. 264/322 |
| 4,336,920 | 6/1982 | Murray ............................. 264/328.9 |
| 4,389,365 | 6/1983 | Kudrisnetz ....................... 264/297.8 |

FOREIGN PATENT DOCUMENTS 748352 12/1966 Canada ................................. 425/517

*Primary Examiner*—James Lowe
*Attorney, Agent, or Firm*—Lowell W. Gresham

[57] ABSTRACT

A flash free, compression molded object which includes an insert and is formed using only one mold plate is disclosed. Molding compound is trapped in a mold cavity between the insert and mold plate. An extrusion vent allows excess molding compound and curing gases to escape from the mold cavity. Systems for forming a pin hole within the molded object and removing the molded object from the mold plate are also disclosed.

5 Claims, 2 Drawing Figures

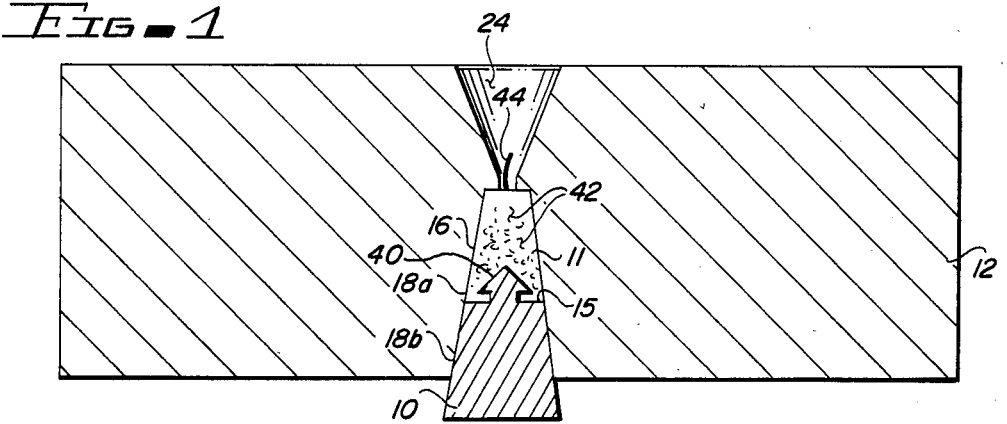
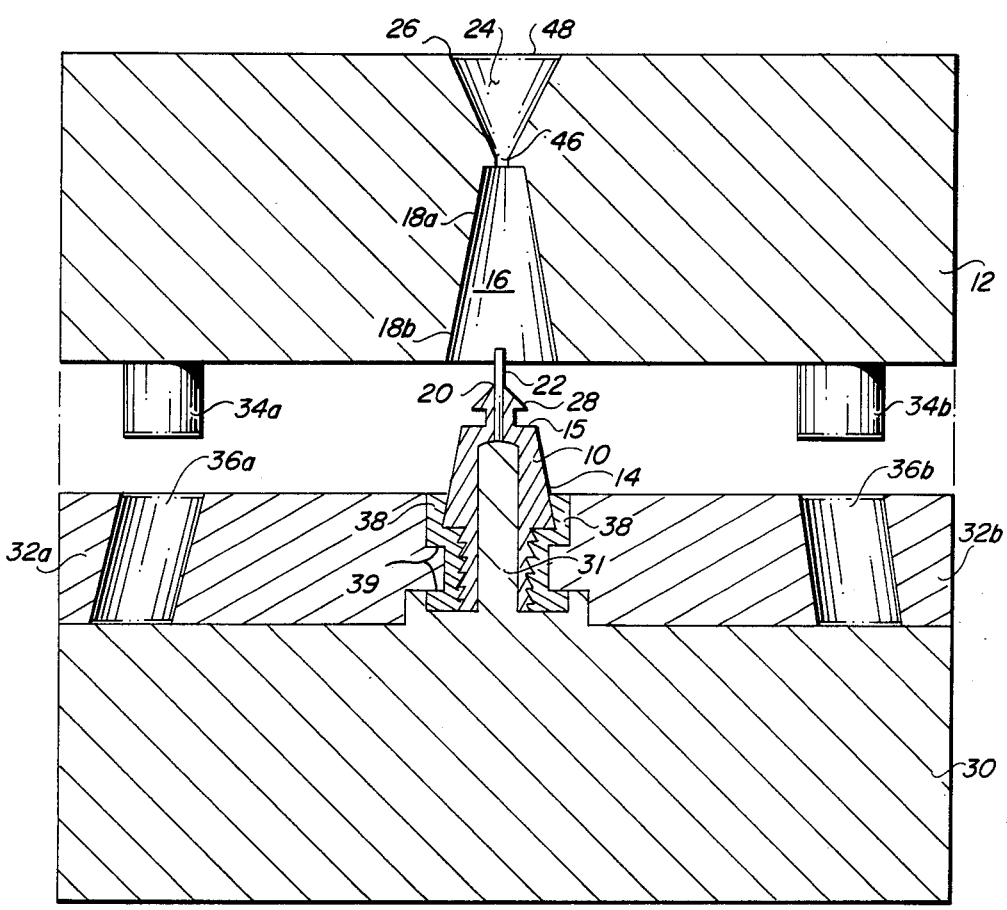

COMPRESSION MOLDING AGAINST AN INSERT

BACKGROUND OF THE INVENTION

This invention relates generally to a method for compression molding. Specifically, the present invention relates to molding to an object called an insert and to entrapping the molding compound in a cavity formed between the insert and a single mold plate.

Three techniques of conventional molding are known: compression, transfer, and injection. Each technique differs from the others in the type of molding compound typically used and the approach taken to load the compound into a mold cavity. Thermosettting resins, which become permanently rigid when heated, are typically used in compression and transfer molding. Compression molding requires individual handling of the compound. However, in transfer molding the compound is automatically forced into one or more mold cavities by an independent part of the mold structure. On the other hand, injection molding typically uses a thermoplastic compound, which softens when heated and hardens when cooled. Furthermore, injection molding uses an external structure to automatically force the compound into a tightly closed mold that may contain several cavities connected together by a series of branch passages.

Compression molding offers certain advantageous over the other molding techniques. The tooling costs are lower because no mechanism is required to automatically load molding compound. Further, the molding compound escapes being masticated by automatic loading mechanisms. Thus, the molded objects demonstrate higher mechanical properties. This is especially significant when the molding compound contains internal fibers for strenghtening the molded object. Such fibers tend to remain randomly oriented and unbroken, and thus produce stronger molded objects having tighter ID and OD tolerances.

The existing compression molding methods require the use of a mold comprised of at least two complimentary mold plates constructed so that the plates are mated together a mold cavity remains between the plates. First, the mold is heated to a predetermined temperature, and a predetermined quantity of a thermosetting resin is measured. Then, the mold is opened and the measured quantity of thermosetting resin is placed in the mold cavity between the mold plates. Next, the mold plates are clamped together and remain clamped for a predetermined period of time. During this period the heat in the mold and the clamping pressure transfer to the thermosetting resin causing the resin to assume the shape of the cavity and to undergo an irreversible chemical reaction known as curing. Next, the mold plates are momentarily separated to allow curing gasses to escape from them mold cavity, a step known as breathing, and then the plates are clamped together again for another predetermined period of time. Finally, the mold plates are again separated and the resulting molded object is removed typically by using ejector pins. The use of ejector pins poses a problem because they tend to make scarring marks on the molded object. Flash, which forms during curing when excess resin escapes the cavity at the parting line between the mold plates, poses an additional problem because it must then be removed from the finished object.

The existing compression molding methods contain several disadvantages which are improved in the present invention. Specifically, the multiple mold plates, the breathing step, the use of ejector pins, and the formation of flash are all seen as causing an unnecessary complication, expense, and waste of time in a method for compression molding, and are thus addressed in the present invention.

SUMMARY OF THE INVENTION

The present invention relates to a method for compression molding to an insert. The method defined in the present invention uses a mold which needs to be comprised of no more than a single mold plate containing a mold cavity. This mold cavity could be considered to consist of two portions, an upper portion which defines the shape of the molded object, and a lower portion which mates with an insert. The insert is likewise defined to have a shape corresponding to the lower portion of the mold cavity. The present invention further defines steps for loading a molding compound and for pressing the insert into the mold cavity so that the insert mates with the mold cavity.

One key feature, which provides several benefits for the present invention over existing methods, concerns the use of the insert. In the present invention the insert, which becomes part of the resulting molded object, replaces the second mold plate required by existing methods. Hence, a simplification occurs through the elimination of a complicated mold plate and through the elimination of the step for removing the resulting molded object from that plate. Further, since the present invention uses only one mold plate, no flash occurs at a parting line between multiple mold plates. Another simplification occurs by the elimination of a step for removing such flash from the resulting molded object. Another benefit results from the insert becoming a part of the resulting molded object. The resulting molded object may be removed from the mold plate by pulling on the insert instead of pushing the molded object out of a mold using ejector pins. Thus, the resulting molded object will contain scar marks caused by ejector pins.

Another key feature of a preferred embodiment of the present invention concerns providing an extrusion vent between the upper portion of the mold cavity and the exterior of the mold plate. The provision of an extrusion vent obviates the breathing step required in existing methods. Therefore, the present invention is simplified over existing methods through the elimination of this step. Additionally, the extrusion vent provides an escape path for excess molding compound. In existing methods this excess causes flash which must later be removed in a separate step. Hence the benefits of flash, such as uniformity between resulting molded objects, are obtained without the flash.

Yet another key feature of a preferred embodiment of the present invention concerns the formation of a pin hole within the resulting molded object. Such a pin hole allows the insertion of small pin-like objects into and removal from the resulting molded object.

Still another key feature of a preferred embodiment relates to a technique for removing the resulting molded object from the mold plate. This technique provides for automatically gripping the insert as the insert is pressed into the mold plate. A camming means performs the gripping by moving a cam member toward the insert as the insert moves into the mold plate. Thus, no gripping occurs before the insert begins to move into the cavity and the insert can be easily mounted in and removed from the camming means. But, as the insert moves into the mold plate and mates with the lower portion of the mold cavity, the gripping action becomes sufficient to allow removal of the resulting molded object by pulling it from the mold plate.

Other important features of this invention will become apparent from a study of the following specification, claims, and the attached drawings.

BRIEF DESCRIPTION OF THE DRAWINGS

FIG. 1 is a cross-sectional view of the present invention, showing the cooperation of the invention's major features during curing.

FIG. 2 is a cross-sectional view of apparatus used in a specific embodiment of the present invention.

DETAILED DESCRIPTION OF THE INVENTION

FIG. 1 illustrates the major parts of a specific embodiment of the present invention and the cooperation of these major parts. This cooperation describes the basic molding operation. Insert 10 is shown mated with mold plate 12. Molding compound 11 is entrapped within mold cavity 16 between insert 10 and upper portion of mold cavity walls 18A. Molding compound 11 represents the substance that is molded in the molding operation and may comprise a thermosetting, thermoplastic, or other material.

The present invention additionally relates to a procedure which causes these major parts to successfully cooperate with each other. The procedure produces a resulting molded object which is comprised of insert 10 bonded to molded molding compound 11.

General Procedure

The first step concerns setting up the apparatus used in conjunction with the present invention. This embodiment of the present invention adapts to a standard mold press (not shown), such as one with a seven inch diameter ram. The set up step requires attaching mold plate 12 to such a standard press.

The next step of the procedure requires heating mold plate 12. In this embodiment heating is needed because molding compound 11 is a thermosetting resin which needs heat as a catalyst before the thermosetting chemical reaction starts and results in the curing of molding compound 11. A standard mold press provides the means for heating mold plate 12. Mold plate 12 acts as a heat reservoir since it is a relatively large metal mass compared to the size of the object to be molded. In this specific embodiment molding compound 11 is molded into a general conical shape approximately 1.2 inches in height with a base diameter of approximately 0.6 inches. The mold plate measures approximately three inches by seven inches by seven inches and is heated to a temperature in the 300–350 degrees F. range. Thus when molding compound 11 is entrapped within mold cavity 16, heat contained in mold plate 12 transfers to molding compound 11 thereby causing the thermosetting chemical reaction to occur.

The application of a suitable lubricant (not shown), such as silicone, to mold cavity walls 18 aids the removal of the resulting molded object from mold plate 12 by minimizing the object's tendency to stick within mold plate 12. Additionally, the lubricant eases the task of cleaning mold cavity walls 18.

The application of an adhesive 40 to insert bonding surface 15 prevents molding compound 11 from spinning relative to insert 10 in the resulting molded object. Insert bonding surface 15 defines that surface of insert 10 which bonds to molding compound 11. In this embodiment a "B" staged epoxy serves as adhesive 40. This "B" staged epoxy behaves similarly to a thermosetting resin in that it is partially cured when applied to insert bonding surface 15 and requires heat as a catalyst to become activated and completely cure. Thus, this epoxy cures in the same manner as the thermosetting resin used for molding compound 11 in this specific embodiment. It will of course be understood that other means of preventing relative rotary movement might be used, such as protrusions, fins, etc. extending from insert 10 into molding compound 11.

Next, a suitable quantity of molding compound 11 is measured. The volume remaining in mold cavity 16 after insert 10 is mated with lower portion of mold cavity walls 18b, the characteristics of molding compound 11, and the density of the resulting molded object all combine to define the amount of molding compound required. Measuring a quantity slightly greater that the amount required provides desirable effects. A precisely correct quantity of molding compound 11 is very difficult to obtain due to variations in insert 10 dimensions, variations in measuring molding compound 11, and variations in the quantity of molding compound 11. However, such a slightly greater than required amount insures that mold cavity 16 will be completely filled when molding compound 11 is entrapped within mold cavity 16 regardless of such variations. The present invention refers to that amount which is greater than required as excess 44. To achieve uniform dimensions and uniform density between different resulting molded objects, excess 44 must be allowed to escape mold cavity 16. The present invention provides a sufficient path for this escape through extrusion vent 24, but some care must be taken in measuring molding compound 11 to prevent excess 44 from being too great. In this specific embodiment, between 7.0 and 7.5 grams of molding compound 11 satisfies the measurement step.

Another step in the procedure concerns placing the insert in the mold press. A standard mold press (not shown) typically accommodates two mold plates. The present invention only requires one mold plate. Thus, in this embodiment insert 10 adapts to a standard mold press through a pressure plate 30, which as shown in FIG. 2 simulates a second mold plate.

Yet another step relates to loading the measured molding compound 11 between insert 10 and mold cavity walls 18. Loading is the term given to transferring molding compound 11 to the location in the mold where it will be formed into a molded object. In this embodiment, minimizing internal stress problems and tolerance variations between resultant objects, and maximizing resultant object strength and surface smoothness are design goals which affect both the type of molding compound 11 used and this loading step. This specific embodiment utilizes a thermosettting resin with embedded fibers 42 for molding compound 11. The achievement of these design goals requires that embedded fibers 42 be substantially randomly oriented within molding compound 11. Molding compound 11 typically comes supplied with the fibers substantially randomly oriented. Thus, the loading step should employ means that insure the fibers remain substantially randomly oriented. In this embodiment molding compound 11 is measured and placed on insert bonding surface 15 by hand, and then transferred to mold cavity 16 as insert 10 is mated with lower portion of cavity walls 18b. However, it will be understood by those skilled in the art that many methods of loading the mold can be utilized and that different types of molding compound may adapt to different loading methods.

Next, insert 10, mates with mold plate 12. The mating of insert 10 with mold plate 12 requires a significant amount of force because excess 44 of molding compound 11 tends to cause the amount of molding compound 11 present in mold cavity 16 to be slightly greater than the given volume accommodates. A standard mold press (not shown) provides the necessary force, which in this specific embodiment is approximately 300 pounds. When insert 10 is mated with mold plate 12 at lower portion of cavity walls 18b, molding compound 11 is entrapped within mold cavity 18 under a substantially pressure. This pressure causes molding compound 11 to adapt to the shape defined by upper portion of cavity walls 18a. Again, care in measuring molding compound 11 should be taken to insure that excess 44 is not too great. Too large a quantity of excess 44 could prevent insert 10 from becoming properly registered against lower portion of cavity walls18b, or could cause damage to insert if the force exerted by the mold press increasews to drive insert 10 into proper registration regardless of the amount of excess 44 of mounting compound 11.

In this embodiment utilizing a thermosetting resin, a curing cycle time is observed once insert 10 mates with mold plate 12. This cycle time allows the thermosetting resin, of which molding compound 11 is comprised, to become partially cured. Curing refers to the thermosetting chemical reaction that causes molding compound 11 to harden and become infusible. In this step the curing needs only sufficient completion to allow removal of the resulting molded object from mold plate 12 without damage to the resultant object. This specific embodiment uses a 3 minute cycle curing time.

Another step of the procedure relates to removing the resulting molded object from mold plate 12. This embodiment of the present invention uses only a single mold plate. Therefore, both mold plate 12 and insert 10 are designed to insure that the resultant object is removable. Thus, the resultant object is removed by gripping insert 10 and pulling insert 10 out from mold plate 12. The resultant object may tend to stick within mold plate 12 in spite of lubrication efforts at minimizing the sticking. However, a standard mold press (not shown) grips insert 10 and provides the necessary pulling force.

Finally, this embodiment performs a post-curing step by placing the resultant object in an approximately 350 degree F. oven (not shown) for four hours. Since the curing is completed in an oven, the time molding compound 11 spends in mold plate 12 is minimized, and the mold plate 12 is efficiently used.

The parts used to accomplish the molding procedure in this embodiment of the present invention have specific characteristics, as illustrated in FIG. 2, which allow the parts to successfully cooperate with each other.

The Parts

Mold plate 12 adapts to a standard mold press (not shown) and serves as a heat reservoir. As discussed above, mold plate 12 is dimensioned accordingly and constructed of a suitable material. Further, mold plate 12 contains mold cavity 16 which serves as a mate for insert 10 and defines the shape of the resultant object, and mold plate 12 contains extrusion vent 24 which serves as an escape path for curing gases and excess 44 of molding compound 11.

Removing a portion of mold plate 12 from one of the mold plate 12 surfaces forms mold cavity 16. Mold cavity walls 18 are defined as the boundary between mold plate 12 and mold cavity 16. Mold cavity walls 18 consist of two sections corresponding to the two functions performed by the mold cavity.

Upper portions of mold cavity walls 18a represent the boundary between mold plate 12 and that portion of mold cavity 16 which defines a predetermined outline of the resulting molded object. Upper walls 18a exist as an integral part of mold cavity walls 18 and are located adjoined with and toward the inside of mold plate 12 from lower portion of mold cavity walls 18b. As shown in FIG. 1, the intersection of upper walls 18a and lower walls 18b occurs where insert bonding surface 15 contacts mold cavity walls 18. Although the precise shape of upper walls 18a depends on the shape of the resulting molded object, in this embodiment upper walls 18a circumscribe a portion of mold cavity 18 which generally tapers from a large cross-sectional area toward the outside of mold plate 12 to a smaller cross-sectional area toward the inside of mold plate 12. This taper allows the removal of the resultant molded object from mold plate 12.

Lower walls 18b mate with the first surface 14 of insert 10. Therefore, lower walls 18b are shaped recriprocally to first surface 14 of insert 10. When insert 10 is properly mated with mold plate 12, first surface 14 tightly registers against the recriprocally corresponding lower walls 18b. The tightness of the registration is maintained in the area of lower walls 18b which is nearer the inside of mold plate 12. At all points along a plane at the intersection of upper walls 18a and lower wall 18b, this registration sufficiently maintains the required pressure when a proper quantity of molding compound 11 is inside mold cavity 16. Additionally, this registration sufficiently prevents molding compound 11 from escaping mold cavity 16 at the area of registration. Further, in this embodiment the area of lower walls 18b that meets the tight registration requirements also tapers similarly to that of upper walls 18a to facilitate the removal of the resultant molded object from mold plate 12.

Extrusion vent 24, which connects mold cavity 16 to exterior 26 of mold plate 12 terminates on one end at relatively small opening 46 in upper portion of cavity walls 18a and tapers to relatively large opening 48 in the exterior of mold plate 12. While molding compound 11 cures, excess 44 of molding compound 11 (see FIG. 1) and curing gasses (not shown) escape mold cavity 16 through extrusion vent 24.

A further consideration of extrusion vent 24 relates to small opening 46. As mentioned above, a sufficient pressure must be maintained within mold cavity 16 during the curing cycle time. Small opening 46 maintains that pressure by remaining as small as possible. Conversely, small opening 46 is also large enough to allow a sufficient amount of excess 44 along with the curing gasses to escape mold cavity 15 during the cycle curing time. In this specific embodiment small opening 46 is an approximate 0.040 inch diameter hole in upper walls 18a.

Another consideration of extrusion vent 24 relates to the taper of the passageway from smaller opening 46 to larger opening 48. This taper tends to prevent small opening 46 from becoming clogged with excess 44 of molding compound 11 as compound 11 begins to cure and harden during the curing cycle time. The taper further tends to prevent clogging of small opening 46 from one curing cycle to the next.

Insert 10 contains several features which are significant in the present invention. In this specific embodiment insert 10 is made from aluminum and is manufactured in a particular shape. As mentioned above, insert 10 contains a first surface 14 which mates with lower portion of mold cavity walls 18b and conforms to the shape dictated by lower walls 18b. First surface 14 is a tapered surface enclosing a generally conically shaped volume in which the cross-sectional area of the cone decreasingly tapers toward insert bonding surface 15. The use of this shape for first surface 14 tends to ease insert manufacturing requirements, assure a tight registration with recriprocally shaped lower walls 18b, and ease removal of the resulting molded object from mold plate 12.

A bond strengthening umbrella 28 located on insert bonding surface 15 of insert 10 aids the attachment of molding compound 11 to insert 10. When molding compound 11 cures between umbrella 28 and bonding surface 15, the resulting bond between molding compound 11 and insert 10 is stronger than would otherwise occur without umbrella 28. Umbrella 28 both causes an increase in bonding area and necessitates a part of cured molding compound 11 to break away from the rest of molded compound 11 before the molded compound can separate from insert 10. Both are factors responsible for the increase in bonding strength.

This specific embodiment of the present invention contains a small aproximately 0.0675 inch diameter pin hold through insert 10 extending into molded compound 11 approximately three-fourths the distance of molded compound 11 in the resulting molded object. In this embodiment, the pin hole is used to retain small pin-like objects inside the resulting molded object. Thus, insert 10 contains aperture 20 for forming this pin hold. Aperture 20 extends through the central area of insert bonding surface 13 and bond strengthening umbrella 28.

The formation of the pin hole alters the above described molding procedure. In this specific embodiment, steel pin 22 passes through aperture 30 in the direction of mold cavity 16 and extends beyond insert 10 for a distance corresponding to the length of the pin hole. The lubricant application step also includes applying the lubricant to pin 22. The measured molding compound 11 is then applied to insert 10 by forming compound 11 around pin 22. As insert 10 is mated with mold plate 12, pin 22 is retained in position by pressure plate 30. After the resultant object is removed from mold plate 12 it is then removed from pin 22 leaving the pin hole formed through the interior at the resultant object.

Pressure plate 30 adapts insert 10 to a standard mold press (not shown) and transmits forces exerted by the mold press to insert 10 thereby causing insert 10 to mate with mold plate 12. Pressure plate 30 simulates the general outline of a mold plate only because this shape is accommodated by a standard mold press. Specific embodiments of the present invention which are not adapted to standard mold presses do not require such a pressure plate. Pressure plate 30 additionally contains pressure plate finger 31 to support internal areas of insert 10. Pressure plate finger 31 tends to prevent damage to insert 10 as the mold press exerts the force which causes insert 10 to mate with mold plate 12.

The present invention also provides a camming means for gripping insert 10 as insert 10 is pressed into mold cavity 16. In this embodiment, the camming means is comprised of cam members 32a and 32b which are mounted on pressure plate 30, guide pims 34a and 34b located on and extending beyond the surface of mold plate 12 which contains mold cavity 16, and guide pin receptacles 36a and 36b contained in cam members 32a and 32b respectively for mating with guide pins 34a and 34b respectively.

When the mold press fully opens the cam members 32a and 32b are in a home position exercising little or no gripping action on insert 10. Thus, in this home position insert 10 is not retained within the camming means and can be easily removed from or placed on pressure plate 30. When insert 10 is positioned on pressure plate 30 and the mold press begins to close by moving insert 10 toward mold cavity 16, guide pins 34a and 34b begin to mate with guide pin receptacles 36aand 36b respectively, thereby causing cam members 32a and 32b to move or cam in a direction toward insert 10, perpendicular to the movement of insert 10. As the mold press continues to close cam members 32a and 32b begin to grip insert 10. As the mold press fully closes the gripping action applied to insert 10 by cam members 32a and 32b is substantial enough that after a curing cycle time has been observed the resulting molded object is removed from mold cavity 16 by pulling cam members 32a and 32b away from mold plate 12.

In this specific embodiment guide pins 34a and 34b are cylindrical rods positioned parallel to the direction of movement of insert 10 as insert 10 moves into mold cavity 16. Guide pin receptacles 36a and 36b are enlarged holes in cam members 32a and 32b respectively, and each receptacle is angled away from insert 10. Receptacles 36a and 36b are angled so that the openings where guide pins 34a and 34b first encounter receptacle 36a and 36b respectively are located closer to the insert than are the rest of receptacles 36a and 36b. The angling of guide pin receptacles 36a and 36b causes cam members 32a and 32b to move toward insert 10 as guide pins 34a and 34b mate with guide pin receptacles 36a and 36b respectively. Those skilled in the art will recognize that various combinations of guide pin shapes, angles, locations, and guide pin receptacle and locations will work to achieve the same camming action.

In this specific embodiment the camming means of the present invention uses insert adapter 38. Insert 10 is threaded where cam members 32a and 32b would grip insert 10. Insert adapter 38 uses these threads by being screwed onto insert 10 and then having cam members 32a and 32b come into contact with adapter 38 instead of directing contacting insert 10. This arrangement prevents damage which may otherwise occur to insert 10 from the gripping forces exerted by cam members 32a and 32b. Adapter lips 39 located on insert adapter 38 further prevent damage by providing a greater surface area to push and pull against while mating and removing insert 10 from mold cavity 16. Additionally, insert adapter 38 allows inserts of various sizes to be adapted to a single standard size pressure plate.

As mentioned above, this embodiment of the present invention uses a thermosetting resin with embedded fibers for molding compound 11. These fibers are constructed of fiberglass and account for approximately 20 percent of the weight of the molding compound. Thermoset polyester material No.: 1412-A manufactured by the Glastic Corporation is an example of such a molding compound.

The foregoing description uses various embodiments to illustrate the present invention. However, those skilled in the art will recognize that changes and modifications may be made in these embodiments without departing from the scope of the present invention.

What is claimed is:

1. A method of compression molding a molding compound to an insert having a first surface so that the resulting molded object contains a pin hole of a predetermined cross-sectional area extending through the insert and into the compound for a predetermined length, said method comprising the steps of:

obtaining a mold plate having a mold cavity, said cavity having a shape defined by an upper section having upper cavity walls and by lower cavity walls, said lower cavity walls being shaped to allow registration with the first surface of the insert;

providing an aperture through the insert, said aperture having a cross-sectional area corresponding to the cross-sectional area of the pin hole;

installing a pin through said aperture, said pin extending beyond the insert for a length equivalent to the length of the pin hole, and said pin having a cross-sectional area corresponding to the cross-sectional area of the pin hole;

providing an extrusion vent between said upper section and the exterior of said mold plate;

allowing curing gasses and excess molding compound to escape said mold cavity through said extrusion vent;

loading the molding compound around said pin and between the insert and said mold cavity;

pressing the insert and pin into said mold cavity until the first surface of the insert is abutting said lower cavity walls to close said mold cavity; and removing said pin from the resulting molded object.

2. The method of compression molding as defined in claim 1 additionally comprising the step of tapering said extrusion vent with a smaller end at said upper cavity walls and a larger end at the exterior of said mold plate to prevent excess molding compound from clogging said extrusion vent.

3. The method of compression molding defined in claim 1 wherein said pressing step further comprises:

gripping the insert within a camming means for gripping the insert as the insert is pressed into said mold cavity; and pulling the insert out from said mold cavity by the use of said camming means.

4. The method as defined in claim 1 wherein said loading step additionally comprises the step of applying an adhesive between the insert and the molding compound to prevent the compound from spinning relative to the insert.

5. The method as defined in claim 1 wherein said loading step additionally comprises the steps of:

providing a thermosetting resin;

making a thermosetting compound by dispersing fibers throughout said thermosetting resin;

placing said thermosetting compound on the insert so that said fibers are substantially randomly oriented relative to the insert; and heating said mold plate to cure said thermosetting resin.

* * * * *